United States Patent Office 3,359,084
Patented Dec. 19, 1967

3,359,084
COATED MANGANESE-CONTAINING ALLOYS
Arthur T. Cape, Monterey, Calif., assignor to Coast Metals, Inc., Little Ferry, N.J., a corporation of Delaware
No Drawing. Filed May 26, 1965, Ser. No. 459,086
2 Claims. (Cl. 29—194)

This invention relates generally to coated manganese-containing alloys.

Copper-manganese alloys, in the form of powder, strip, foil, wire and the like, have been used for brazing and like purposes, but are used with difficulty, due to the tendency of the manganese to become oxidized, even in high reducing atmospheres such as dry hydrogen. The reason for this is that there is always some oxygen in the atmosphere in the form of water vapor. The oxygen also comes from the fixtures which are used in the brazing process, from the part which is being brazed, the walls of the retort and even from minute leaks. The manganese is oxidized and the driest of hydrogen will not reduce manganous oxide except at high temperatures.

Nickel, cobalt and other elements have been added to such copper-manganese alloys, for the purpose of preventing crevice corrosion and for other purposes, as, for example, to increase the high temperature properties of the brazing alloy, but such alloys containing nickel and/or cobalt are more difficult to manufacture than are the simple copper-manganese alloys.

This tendency to oxidation of the manganese is particularly marked where the brazing alloy is maintained for prolonged periods of time in a brazing furnace, and at a temperature near but just below the melting point of the alloy, prior to increasing its temperature to the melting point.

I have found that the tendency of the manganese in copper-manganese brazing alloys to become oxidized can be eliminated or minimized, and, at the same time, the manufacture of such alloys with nickel and/or cobalt contents can be rendered easier, by coating the copper-manganese alloys, in the form of powder, strip, foil, wire, or the like with nickel and/or cobalt.

When the copper-manganese brazing alloy is coated with nickel, not only is the oxidation of the manganese reduced, but the coated alloy will melt, wet the parts to be brazed, and flow more readily.

When the copper-manganese brazing alloy is coated with cobalt, a coating of sufficient thickness will not only add a substantial amount of cobalt to the alloy but supplies substantial resistance to oxidation of the manganese. Moreover, since cobalt imparts high temperature properties to the copper-manganese system, there is a great advantage in this method of adding the element.

The nickel and/or cobalt may be applied to the copper-manganese alloys in various ways. The most obvious method is to electroplate the copper-manganese alloys with nickel and/or cobalt.

Another method may be described as follows:

The nickel and/or cobalt, in the form of a solution or in the form of a suspension in liquids such as oil of rosemary may be applied to the copper-manganese alloy, in the form of powder, strip, foil, wire, or the like, and the alloy heated up to a temperature of about 1000° F., leaving a coating of nickel or cobalt on the powder, strip, foil or wire, of surprisingly uniform thickness.

Another way of applying the nickel and/or cobalt is to spray it onto the copper-manganese alloy with a plasma arc gun.

Coatings deposited in this way are often less dense than those deposited electrolytically, but are sufficiently dense and coherent to prevent rapid oxidation of the copper-manganese.

The method is applicable generally to various manganese-copper alloys, in which it is desired to incorporate nickel and/or cobalt, and which have flow points of from 1600° F. to 2000° F. The alloys contain from about 40 to about 75% copper and from about 25% to about 60% manganese.

The thickness of the nickel and/or cobalt coating is such as to impart to the copper-manganese alloys, when melted, a nickel and/or cobalt content of from about 3% to about 18% by weight of the alloy. This means that the alloys, when melted, will contain from about 3% to about 18% of nickel, or from about 3% to about 18% of cobalt, or from about 3% to about 18% of nickel and cobalt. This content of nickel or cobalt or nickel and cobalt does not raise the melting point of the copper-manganese alloy to an extent sufficient to have any effect on the use of the alloy for brazing operations, such as for brazing thin sections of steel.

The method is also applicable to other brazing alloys which contain substantial amounts of manganese, and which are therefore susceptible to oxidation.

For example, manganese-base brazing alloys, such as disclosed in my U.S. Patent No. 3,124,451, fall into this group. Such alloys generally contain from 63 to 69% manganese, from 14 to 18% nickel, and from 14 to 18% cobalt. When applying the method to such manganese-base alloys, the thickness of the nickel and/or cobalt coating is such as to increase the nickel and/or cobalt content of the alloy, but not to an extent sufficient to have any effect on the use of the alloy for brazing operations, such as for brazing thin sections of steel.

Having thus described my invention, I claim:

1. As an article of commerce, a copper-manganese alloy, in the form of powder, strip, foil, wire or the like, and consisting of from about 40% to about 75% copper, and from about 25% to about 60% manganese, said alloy having a coating thereon, of nickel and/or cobalt, in an amount sufficient to provide a nickel and/or cobalt content of from about 3% to about 18% in the alloy, when the coated copper-manganese alloy is melted.

2. As an article of commerce, a manganese-nickel-cobalt alloy, in the form of powder, strip, foil, wire or the like, and consisting of from 63 to 69% manganese, 14 to 18% nickel, and 14 to 18% cobalt, said alloy having a thin coating of nickel and/or cobalt thereon, in an amount sufficient to prevent oxidation of the manganese, when the coated manganese-nickel-cobalt alloy is melted.

References Cited

UNITED STATES PATENTS

| | | | |
|---|---|---|---|
| 682,891 | 9/1901 | Thomson | 75—161 |
| 2,294,895 | 9/1942 | Drapeau | 29—192 |
| 2,301,320 | 11/1942 | Phillips | 29—194 |
| 2,407,995 | 9/1946 | Moyer | 75—161 |
| 2,988,807 | 6/1961 | Boggs | 29—199 XR |
| 3,197,859 | 8/1965 | Cape | 75—161 XR |

HYLAND BIZOT, *Primary Examiner.*